United States Patent [19]

Hallock

[11] 4,003,286
[45] Jan. 18, 1977

[54] CLINCH TYPE FASTENER

[76] Inventor: Robert L. Hallock, 7136 NE. 8th Drive, Boca Raton, Fla. 33432

[22] Filed: Oct. 23, 1975

[21] Appl. No.: 625,349

[52] U.S. Cl. .................................. 85/31; 29/432
[51] Int. Cl.² ................................ F16B 15/00
[58] Field of Search ............ 85/26, 31; 29/432, 511

[56] References Cited

UNITED STATES PATENTS

| 886,515 | 5/1908 | Jude | 85/26 X |
|---|---|---|---|
| 1,930,611 | 10/1933 | Freter | 85/31 X |
| 3,095,777 | 7/1963 | Hallock | 85/31 |
| 3,143,030 | 8/1964 | Muller | 85/31 X |
| 3,277,768 | 10/1966 | Templin et al. | 85/31 X |
| 3,292,481 | 12/1966 | Couch | 85/31 X |
| 3,322,018 | 5/1967 | Moehlenpah et al. | 85/31 X |
| 3,341,932 | 9/1967 | Haller | 29/432 |
| 3,382,752 | 5/1968 | Black et al. | 85/31 X |
| 3,699,636 | 10/1972 | Walker | 29/432 |
| 3,906,832 | 9/1975 | Lunn et al. | 85/26 |

FOREIGN PATENTS OR APPLICATIONS

| 496,338 | 11/1938 | United Kingdom | 85/31 |
| 778,669 | 7/1957 | United Kingdom | 85/31 |

Primary Examiner—Roy D. Frazier
Assistant Examiner—Thomas J. Holko
Attorney, Agent, or Firm—A. Yates Dowell, Jr.

[57] ABSTRACT

Fastener apparatus for securing lightweight insulating material onto sheet metal without passing entirely through such sheet metal. The apparatus includes a clinch type fastener having a penetrating end with means to provide limited penetration of relatively thin sheet metal and to clinch portions thereof to attach the fastener to the sheet metal and to prevent ready withdrawal of the fastener.

2 Claims, 8 Drawing Figures

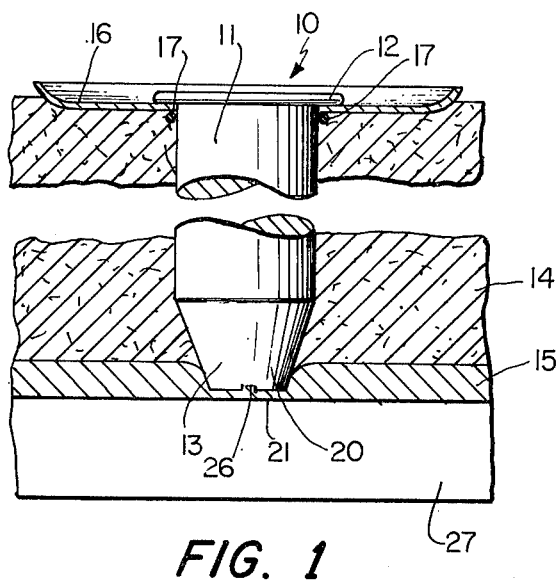
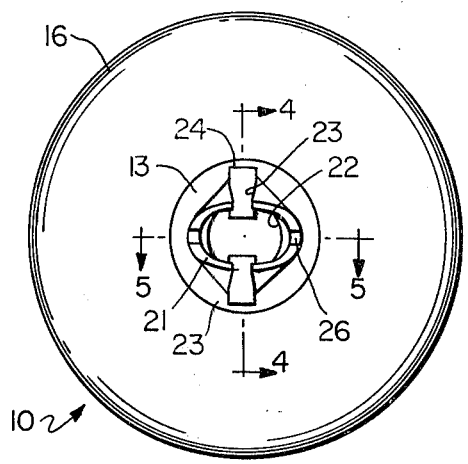
FIG. 1
FIG. 2
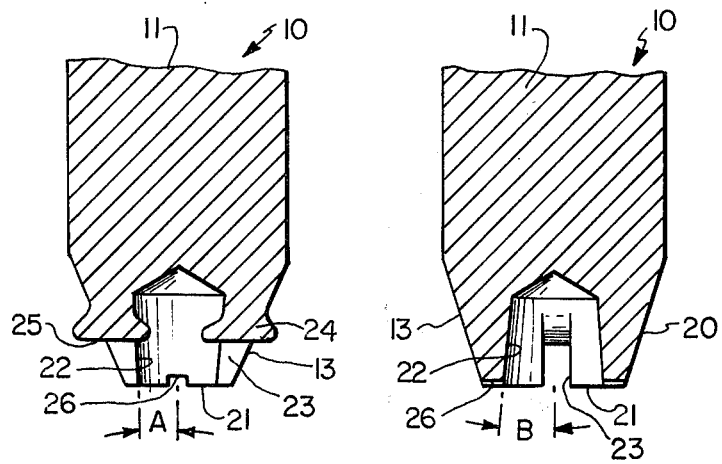
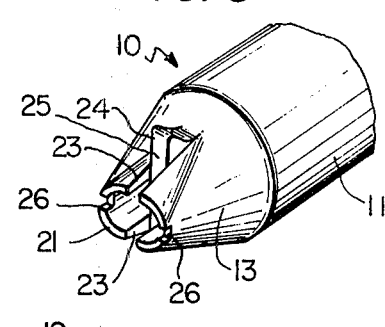
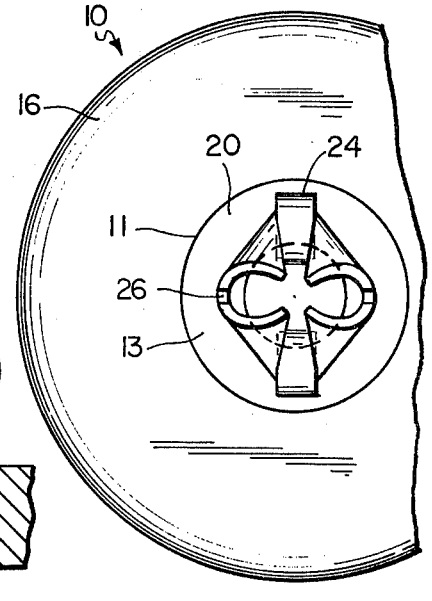
FIG. 3
FIG. 4
FIG. 5
FIG. 6
FIG. 7
FIG. 8

CLINCH TYPE FASTENER

BACKGROUND OF THE INVENTION

1. Field of the Invention

This invention relates generally to fasteners for mounting one object onto another and relates specifically to a fastener for securing lightweight insulating material to sheet metal without penetrating entirely through such sheet metal, and without welding thereto.

2. Description of the Prior Art

In the past, many driven fasteners have been provided for connecting two or more objects together in assembled relationship. Most of these fasteners have been of the nail or screw type in which the fastener penetrates a relatively thick base material such as wood and is held in place by friction. Other fasteners have been of the rivet type in which the shank of the rivet is located within aligned openings and the end is peened over to hold the objects together. Some of the prior art fasteners, particularly of the nail type, have had split legs which are adapted to spread apart on penetration and provide a clinching action to resist ready withdrawal. These fasteners obviously must be driven into a relatively thick base material in order for the legs to spread apart.

In my prior patent, U.S. Pat. No. 3,095,777, a clinch type fastener was provided for attaching insulating material to sheet metal by a clinching action and the present invention is an improvement over the same. The prior patent had a deformable penetrating end with an inwardly extending cavity having generally cylindrical walls so that when the fastener was driven the penetrating end created a bulbous portion of the sheet metal and collapsed around the same ordinarily without penetrating entirely through the sheet metal.

SUMMARY OF THE INVENTION

The present invention is embodied in a clinch type fastener having a shank with a relatively large head at one end and a penetrating portion at the opposite end. The penetrating portion includes an inwardly tapering, generally frusto-conical configuration terminating in a blunt end. A cavity extends inwardly from the blunt end generally axially of the shank. The penetrating portion has a pair of diametrically opposed slots or recesses extending inwardly from the blunt end generally axially of the shank which provide communication between the cavity and the exterior of the fastener. Such slots are formed by forging or extruding a pair of enlargements having substantial flat aligned bottom surfaces inwardly of the blunt penetrating end so that such enlargements function as stop members which limit penetration into the sheet metal.

The recesses divide the penetrating portion of the fastener into two substantially U-shaped members and the walls of the U-shaped members adjacent to the slots are inclined downwardly and inwardly to cause the penetrating portion to deform in a controlled manner when the fastener is driven so that a pair of bulbous masses are formed in the sheet metal. When an axial driving force is imparted to the fastener, the penetrating portion of the fastener is driven into the sheet metal until the enlargements engage the same to substantially stop further penetration while simultaneously the sides of each of the U-shaped members adjacent to the recesses collapse toward each other as the bottom or bight portion of each of the U-shaped members remains substantially nondeformed. The forming of a pair of bulbous masses and clinching the penetrating end of the fastener about such bulbous masses substantially increases the holding capacity of the fastener while the enlargements reduce the likelihood of penetrating entirely through the sheet metal base material regardless of the axial striking force.

It is an object of the invention to provide an improved clinch type fastener having increased resistance to penetrating entirely through the sheet metal, increased capacity for resisting withdrawal as well as a structure for substantially preventing rotational movement of the fastener.

BRIEF DESCRIPTION OF THE DRAWING

FIG. 1 is a side elevation illustrating one application of the invention.

FIG. 2 is a bottom plan view of the fastener before driving.

FIG. 3 is a perspective of the penetrating end of the fastener of FIG. 2.

FIG. 4 is an enlarged fragmentary vertical section taken on the line 4—4 of FIG. 2.

FIG. 5 is an enlarged fragmentary vertical section on the line 5—5 of FIG. 2.

FIG. 6 is a section similar to FIG. 4 and illustrating the position of the penetrating portion after the fastener has been driven.

FIG. 7 is a section similar to FIG. 5 and illustrating the position of the penetrating portion after the fastener has been driven.

FIG. 8 is an enlarged bottom plan view showing the configuration of the penetrating portion after the fastener has been driven.

DESCRIPTION OF THE PREFERRED EMBODIMENT

With continued reference to the drawing, a fastener 10 is provided having a shank 11 with an enlarged head 12 at one end and a penetrating portion 13 at the opposite end. Normally the fastener 10 is utilized to connect a sheet or panel of lightweight insulating material 14 to a sheet metal substrate 15 without penetrating entirely through the sheet metal. Since the insulating material 14 ordinarily is relatively flimsy, it is desirable to provide an enlarged washer 16 adjacent to the head 12 so that the insulating material cannot easily slip off of the clinch type fastener. Preferably, the washer 16 is retained adjacent to the head 12 by providing one or more lugs 17 on the shank 11 which resist downward movement of the washer. The lugs 17 insure that the washer 16 remains on the shank 11 before the fastener is driven so that such parts remain in assembled relationship. If desired the head 12 could be made of a substantially greater diameter in which case the washer could be eliminated.

The penetrating portion 13 of the fastener includes a downwardly and inwardly tapering generally frusto-conical outer wall 20 terminating in a blunt end 21. A cavity 22 extends axially inwardly from the blunt end 21 and extends substantially through the penetrating portion of the fastener. The blunt end 21 of the penetrating portion normally is substantially flat to provide cutting edges on penetration; however, it is contemplated that such blunt end could be slightly rounded. After the cavity 22 has been formed, a pair of diametrically opposed slots or recesses 23, which extend inwardly from the blunt end 21 approximately half the length of the cavity, are formed in the penetrating portion 13 by pressing the fastener into a forming or forging die (not shown).

The die is shaped in a manner to cut the material of the penetrating portion 13 to form the recesses 23 and simultaneously forge or extrude the displaced material toward the head of the nail to form aligned enlargements 24. As illustrated best in FIGS. 4 and 6, the displaced material forms a first portion which flows inwardly into the cavity 22 and a second portion which flows outwardly of the penetrating portion 13. The bottom surfaces of the enlargements define flat shelves 25 which limit penetration of the fastener. While the enlargements 24 are being formed, the recesses 23 initially divide the lower end of the penetrating portion into a pair of opposed substantially C-shaped members. However, continued downward movement into the die causes the areas adjacent to the recesses on each side of the penetrating portion to be squeezed toward the other side to form a pair of opposed generally flat sided U-shaped members which define a generally elliptical configuration at the blunt end 21.

With particular reference to FIGS. 2–5, in order to control the direction and amount of collapsing of different segments of the U-shaped members, the forming of the U-shaped members causes the side walls of the cavity 22 adjacent to the recesses 23 to be inclined downwardly and inwardly at an angle A which is approximately 5° to 7° to a plane parallel to the axis of the shank. Along the bottom or bight portion of each U-shaped member, the side walls of the cavity 22 either remain substantially straight or are inclined downwardly and outwardly at an angle up to approximately 4° to 6° to a plane parallel with the axis of the shank. Just prior to the completion of the forming process of the penetrating portion 13, the bight portion of each of the U-shaped members engages an obstruction which forms a slight indentation 26 therein.

When the fastener 10 is driven into sheet metal, such fastener must be at least as hard as the sheet metal into which the penetrating portion is to be driven, or a hardness generally corresponding to Rockwell C-20. If desired, the fastener may be constructed of relatively soft metal after which at least the penetrating portion is hardened. A hardness of Rockwell C-20 is enough to penetrate the sheet metal 15 but is soft enough to permit the sides of the U-shaped members to bend without breaking and to permit the lugs 17 to be pinched out of the shank 12. This permits the shank 12 and the washer 16 to be assembled after the penetrating portion of the shank has been hardened.

Due to the process of forming the U-shaped members, the blunt end 21 at the bight portion of each of the U-shaped members has a thickness of approximately 0.011 to 0.013 of an inch and each of the side walls of the U-shaped members usually has a thickness of approximately 0.006 to 0.007 of an inch adjacent to the recesses 23. The inward inclination and the reduced thickness of the sides of the U-shaped members cause such sides to have a tendency to collapse toward each other when driven into the sheet metal while the relatively straight or outward inclination of the bight portions together with the increased thickness cause little or no collapsing movement of the bight portion of each of the U-shaped members. The indentations 26 in the bight portions of the U-shaped members slightly weaken such members so that they function as hinges to encourage the inward collapsing of the sides of such U-shaped members. As a result of the controlled collapsing, the U-shaped members of the blunt end 21 of the penetrating portion 13 assume configurations as illustrated in FIG. 8 and engage spaced bulbous masses of metal when the fastener is driven so that any rotation or swivel action of the fastener relative to the sheet metal is resisted or prevented.

In the operation of the device, the sheet metal 15 is located in a position contiguous to a backing member or anvil 27, the insulating material 14 is positioned on top of the sheet metal and a fastener 10 is driven through the insulating material into the sheet metal by an axial driving force from a hammer or pneumatic gun (not shown). Normally the head of a driving tool is magnetized so that the fastener 10 intimately engages the same and such tool is operated to cause an axial driving force to be applied so that the fastener penetrates entirely through the insulating material and strikes the sheet metal 15 with substantial impact. The axial impact force causes the penetrating portion 13 of the fastener to partially penetrate the sheet metal and extrude a pair of bulbous masses 28 into the cavity 22 until the lower surfaces of the enlargements 24 engage the upper surface of the sheet metal to limit further penetration. During the penetration of the end portion of the fastener, the weaker sides of the U-shaped members collapse or curl inwardly toward each other due to the inwardly inclined side walls of the cavity 22 as well as the reduced thickness thereof adjacent to the recesses 23. The collapsing of the U-shaped members about the two bulbous masses substantially prevents any rotation or swivel action of the fastener relative to the sheet metal, substantially prevents ready withdrawal of the fastener, and substantially increases the strength of the neck portion of the bulbous masses due to the configuration of the metal in the area where the neck portion joins the main body of the sheet metal.

I claim:

1. In a clinch type fastener for attaching insulating material to thin sheet metal in which the fastener includes a generally cylindrical shank having a driving portion at one end and a penetrating portion at the opposite end, said penetrating portion having a generally frusto-conical exterior wall tapering inwardly toward the axis of said shank and terminating in a relatively blunt end, said penetrating portion having a cavity extending axially inwardly from said blunt end and defining a cavity wall, said penetrating portion having a pair of diametrically opposed slots extending inwardly from said blunt end generally parallel with the axis of said shank, said slots extending from said frusto-conical exterior wall to the cavity wall, the improvement comprising an enlargement located at the base of each slot, each enlargement having at least one portion extending outwardly of said frusto-conical exterior wall and defining stop means to limit penetration of said fastener into said sheet metal, said enlargements being spaced from said blunt end a distance substantially less than the thickness of the sheet metal, the side walls of the cavity adjacent to said slots tapering downwardly and inwardly toward the axis of said shank at an angle of substantially 5°, the side walls of the cavity remote from said slots tapering downwardly and outwardly from the axis of said shank at an angle of substantially 6°, said inwardly and outwardly tapered walls defining a pair of opposed U-shaped members at said blunt end and defining a generally elliptical configuration, and a shallow groove extending inwardly from the blunt end in a location remote from said slots, whereby a driving force applied axially of said shank causes the blunt end of said penetrating portion to penetrate partially through the sheet metal, extrude a pair of bulbous masses into said cavity and cause the inwardly inclined walls of said cavity adjacent to said slots to collapse inwardly about the bulbous masses and firmly attach the fastener to the sheet metal without penetrating entirely therethrough.

2. The structure of claim 1 in which said side walls adjacent to said slots have a thickness of substantially 0.006 inch at said blunt end, and said side walls remote from said slots have a thickness of substantially 0.012 inch at said blunt end.

* * * * *